United States Patent
Ijichi et al.

(10) Patent No.: US 7,070,160 B2
(45) Date of Patent: Jul. 4, 2006

(54) DIAPHRAGM VALVES

(75) Inventors: Eitaro Ijichi, Kasugai (JP); Shigeru Osugi, Kasugai (JP)

(73) Assignee: CKD Corporation, Komaki (JP)

( * ) Notice: Subject to any disclaimer, the term of this patent is extended or adjusted under 35 U.S.C. 154(b) by 1 day.

(21) Appl. No.: 10/833,026

(22) Filed: Apr. 28, 2004

(65) Prior Publication Data

US 2004/0195534 A1  Oct. 7, 2004

(51) Int. Cl.
*F16K 31/143* (2006.01)

(52) U.S. Cl. ...................... 251/63.5; 251/282

(58) Field of Classification Search ............ 251/45, 251/46, 48, 54, 62, 63, 63.5, 282
See application file for complete search history.

(56) References Cited

U.S. PATENT DOCUMENTS

| | | | |
|---|---|---|---|
| 3,753,526 A * | 8/1973 | Johnson | 236/99 R |
| 6,029,903 A * | 2/2000 | Fukano et al. | 239/119 |
| 6,199,582 B1 * | 3/2001 | Matsuzawa et al. | 137/503 |
| 2003/0111178 A1 * | 6/2003 | Morita | 156/345.33 |

FOREIGN PATENT DOCUMENTS

JP  A 2003-185053  7/2003

\* cited by examiner

*Primary Examiner*—David J. Walczak
*Assistant Examiner*—Peter deVore
(74) *Attorney, Agent, or Firm*—Oliff & Berridge PLC

(57) ABSTRACT

A diaphragm valve capable of increasing durability of a diaphragm comprises a valve body internally formed with a valve chamber having an open upper end and a suck-back chamber having an open lower end, between an inlet passage and an outlet passage, and a through hole which provides communication between the valve chamber and the suck-back chamber. The open end of the valve chamber is closed by a first diaphragm which is brought into and out of contact with a valve seat. The open end of the suck-back chamber is closed by a second diaphragm. The first and second diaphragms are substantially identical in shape. Each circumferential edge portion of the first and second diaphragms is tightly retained by a retaining member mountable to the valve body so that the diaphragms are curved outwardly with respect to the valve chamber and the suck-back chamber respectively. The first and second diaphragms are connected by a connecting rod passing through the through hole so that the diaphragms are deformed synchronously by operation of an actuator.

7 Claims, 4 Drawing Sheets

DIAPHRAGM VALVES

BACKGROUND OF THE INVENTION

1. Field of the Invention

The present invention relates to a diaphragm valve having a suck-back function.

2. Description of Related Art

Figure 5:
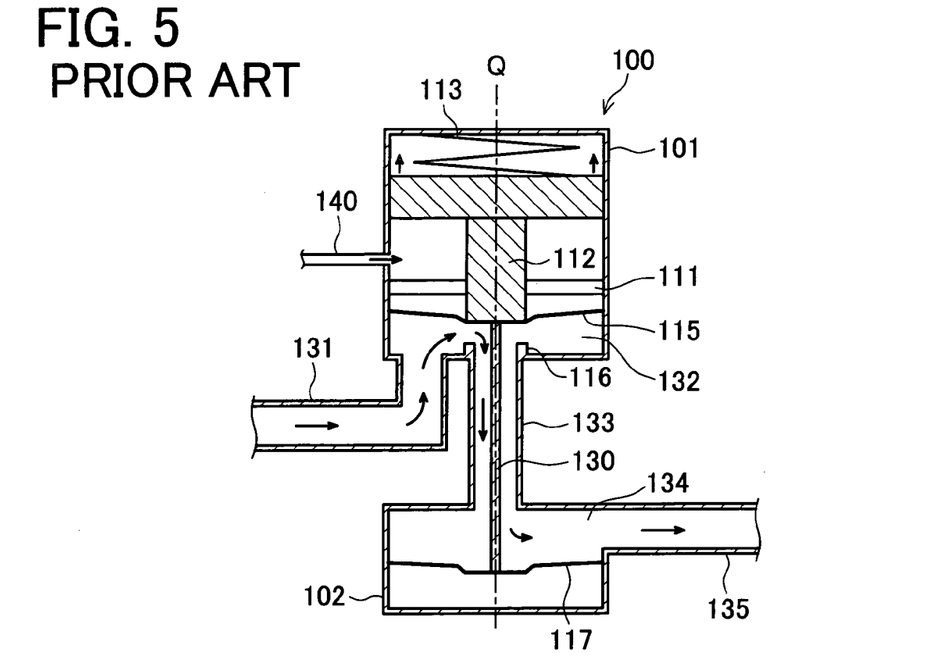
FIG. 5 is a schematically sectional view of a conventional diaphragm in an open state.
Figure 6:
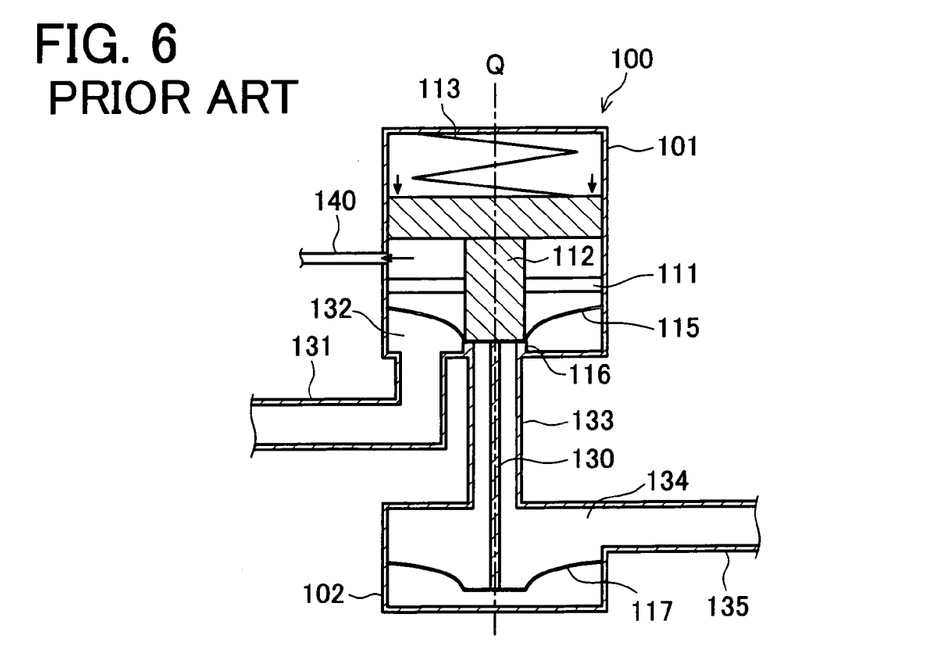
FIG. 6 is a schematically sectional view of the conventional diaphragm in a closed state.

In semiconductor manufacturing processes, conventionally, a predetermined amount of chemical solution are applied to semiconductor wafers to coat each wafer surface with a thin film. Recently, a micro fabrication technique in the semiconductor manufacturing processes has been promoted. Under the circumstances, need arises to exactly control the amount of chemical solution to be applied in order to form the thin film of even thickness. In a semiconductor manufacturing device, correspondingly, a diaphragm valve provided with a suck-back function has been proposed to prevent dripping of the chemical solution from a nozzle tip when supply of the chemical solution is stopped. FIGS. 5 and 6 are schematic sectional views of a diaphragm valve disclosed in Japanese patent unexamined publication No. 2003-185053. In particular, FIG. 5 illustrates the diaphragm valve in an open state and FIG. 6 illustrate the same in a closed state.

A diaphragm valve 100 has a valve part 101 which is partitioned by a partition wall 111 into an upper and lower chambers. In the valve part 101, a piston 112 is centrally placed penetrating the partition wall 111 and normally urged downward by a spring 113. The piston 112 is fixed, at its bottom end, with a diaphragm 115 made of fluorocarbon resin (e.g., Teflon®). The diaphragm 115 is a film member whose outer edge portion is fixed to an inner wall of the valve part 101 and central portion is fixed to a bottom surface of the piston 112.

A valve seat 116 is formed in the valve part 101 at a center of a bottom. A valve chamber 132 in the valve part 101 is connected in fluid communication with a suck-back chamber 134 in an auxiliary part 102 through a connecting pipe 133. In the auxiliary part 102, a diaphragm 117 identical in shape to the diaphragm 115 is placed with an outer edge portion fixed to an inner wall of the auxiliary part 102. These diaphragms 115 and 117, vertically aligned and placed in the same orientation as shown in FIGS. 5 and 6, are connected by a connecting rod 130 mounted coaxially with a center axis Q of the valve 100.

The diaphragm valve 100 constructed as above is operated as follows. When air is supplied into the valve part 101 (i.e., the upper chamber) through an air pipe 140, the piston 112 is pushed up against the resilient force of the spring 113 as shown in FIG. 5, bringing the diaphragm 115 out of contact with the valve seat 116 while deforming the diaphragm 115. Simultaneously, the diaphragm 117 coupled to the diaphragm 115 by the connecting rod 130 exhibits similar motion to that of the diaphragm 115. In this way, the diaphragm valve 100 is opened to allow a liquid entering in the valve chamber 132 through an inlet passage 131 connected to a tank not shown storing a chemical solution to flow through the connecting pipe 133 and the suck-back chamber 134 and to discharge the liquid through an outlet passage 135 connected to a nozzle for discharging the chemical solution. When a leak valve not shown is opened, on the other hand, the piston 112 is moved downward, pushing out the air from the upper chamber through the air pipe 140, by the resilient force of the spring 113 until the diaphragm 115 is brought into contact with the valve seat 116. Thus, the diaphragm valve 100 is closed. At this time, the diaphragm 117 exhibits just the same motion as that of the diaphragm 115.

In diaphragm valves, generally, the motion of a diaphragm causes changes in volume on a downstream side of the diaphragm, which may lead to inappropriate draw-back and push-out of the liquid at valve opening and closing times respectively. In the diaphragm valve 100, however, which is provided with the diaphragm 117 identical in shape to the diaphragm 115 in the suck-back chamber 134, the volumes of the valve chamber 132 and the suck-back chamber 134 are changed exactly equally, but increased and decreased inversely with each other, by the motions of the diaphragms 115 and 117 respectively during the opening/closing operation of the valve 100. Accordingly, the volume change of the valve chamber 132 caused by the motion of the diaphragm 115 is absorbed (counterbalanced) by the motion of the diaphragm 117, so that the inappropriate draw-back and push-out of the liquid can be prevented.

However, the conventional diaphragm valve 100 shown in FIGS. 5 and 6 has a problem that it could perform the suck-back function in theory but not sufficiently in practice because the diaphragm 117 constructed as shown tends to be distorted or warped by the fluid pressure.

This is because that, in the diaphragm valve 100, the diaphragms 115 and 117 are arranged in a vertically aligned relation and in the same orientation; specifically, as shown in FIG. 6, the diaphragm 115 is placed having an outwardly curved portion with respect to the valve chamber 132, whereas the diaphragm 117 is placed having an inwardly curved portion with respect to the suck-back chamber 134. When the liquid is allowed to flow from the inlet passage 131 to the outlet passage 135, the fluid pressure exerts on the diaphragm 115 forming a part of the valve chamber 132 and the diaphragm 117 forming a part of the suck-back chamber 134 respectively. Accordingly, the diaphragm 115 receives the fluid pressure, from below, on the under surface of the outwardly curved portion, so that the diaphragm 115 will hardly be distorted or warped by the fluid pressure. On the other hand, the diaphragm 117 receives the fluid pressure, from above, on the upper surface of the inwardly curved portion. The diaphragm 117 is therefore likely to be crushed and dented.

If the diaphragms 115 and 117 formed with a small thickness for flexibility are irreversibly deformed by the fluid pressure, they may undergo a distortion which impairs the opening/closing operation of the valve 100 or affects the suck-back function. Furthermore, the irreversibly deformed diaphragm 117 would be damaged in a short time, resulting in a short life, which needs frequent replacement, leading to an increase in cost.

In addition to the above problems, the diaphragm valve 100 further has a disadvantage in structure. Specifically, the pipes forming the inlet passage 131, the connecting pipe 133, and the outlet passage 135 are connected to the box-shaped housings forming the valve part 101 and the auxiliary part 102. It is normally conceivable that those components are assembled through welding connection; however, such assembling is unpractical due to difficult replacement of the short-life diaphragm 117 as mentioned above. In the structure shown in FIGS. 5 and 6, furthermore, it is hard to replace the diaphragm 117 placed with the outer edge portion fixed to the auxiliary part 102.

SUMMARY OF THE INVENTION

The present invention has been made in view of the above circumstances and has an object to overcome the above problems and to provide a diaphragm valve which can increase durability of a diaphragm.

Another object of the present invention is providing a diaphragm valve which can be assembled with ease.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a diaphragm valve comprising: an actuator; and a valve part including: an inlet passage; an outlet passage which is brought into communication with the inlet passage when the diaphragm valve is opened; a valve chamber provided with a valve seat and placed between the inlet passage and the outlet passage; a suck-back chamber placed between the inlet passage and the outlet passage and in vertically aligned relation with the valve chamber; a through hole through which the valve chamber and the suck-back chamber are brought into communication with each other when the diaphragm valve is opened; a first diaphragm which integrally includes a valve element and forms a part of the valve chamber and is mounted to have an outward curve with respect to the valve chamber, the first diaphragm being deformable so that the valve element is brought into and out of contact with the valve seat by operation of the actuator; a second diaphragm which forms a part of the suck-back chamber and is mounted to have an outward curve with respect to the suck-back chamber, the second diaphragm being substantially identical in shape to the first diaphragm; and a connecting rod which is movably placed through the through hole and connects the first and second diaphragms so that the first and second diaphragms are synchronously deformed by operation of the actuator.

According to another aspect, the present invention provides a diaphragm valve comprising: an actuator; and a valve body formed with: an inlet passage; an outlet passage which is brought into communication with the outlet passage when the diaphragm valve is opened; a valve chamber which has an open upper end and is provided with a valve seat, the valve chamber being placed between the inlet passage and the outlet passage; a suck-back chamber which has an open lower end and is placed between the inlet passage and the outlet passage; a through hole through which the valve chamber and the suck-back chamber are brought into communication with each other when the diaphragm valve is opened, a surrounding portion of the through hole forming the valve seat; a first diaphragm which integrally includes a valve element and an circumferential edge portion and is placed to close the open end of the valve chamber, the first diaphragm being deformable so that the valve element is brought into and out of contact with the valve seat; a second diaphragm which is provided with an circumferential edge portion and is placed to close the open end of the suck-back chamber; a first retaining member which retains the circumferential edge portion of the first diaphragm against the valve body to fix the first diaphragm in place; a second retaining member which retains the circumferential edge portion of the second diaphragm against the valve body to fix the second diaphragm in place; and a connecting rod which is placed through the through hole and connects the first and second diaphragms so that the first and second diaphragms are synchronously deformed by operation of the actuator.

According to another aspect, the present invention provides a diaphragm valve comprising: an actuator: a valve body formed with: an inlet passage; an outlet passage which is brought into communication with the inlet passage; a valve chamber which has an open upper end and is provided with a valve seat, the valve chamber being placed between the inlet passage and the outlet passage; a suck-back chamber which has an open lower end and is placed between the inlet passage and the outlet passage; a through hole through which the valve chamber and the suck-back chamber are brought into communication with each other when the diaphragm valve is opened, a surrounding portion of the through hole forming the valve seat; a first diaphragm which integrally includes a valve element and an circumferential edge portion and is placed to have an outward curve with respect to the valve chamber and to close the open end of the valve chamber, the first diaphragm being deformable so that the valve element is brought into and out of contact with the valve seat by operation of the actuator; a second diaphragm which includes an circumferential edge portion and is placed to have an outward curve with respect to the suck-back chamber and to close the open end of the suck-back chamber; and a first retaining member which retains the circumferential edge portion of the first diaphragm against the valve body to fix the first diaphragm in place; a second retaining member which retains the circumferential edge portion of the second diaphragm against the valve body to fix the second diaphragm in place; and a connecting rod which is movably placed through the through hole and connects the first and second diaphragms so that the first and second diaphragms are synchronously deformed by operation of the actuator.

According to the diaphragm valve of the invention, the first and second diaphragms integrally are connected by the connecting rod to be synchronously deformed in association of the opening/closing operation of the valve by the actuator so that the volume of the valve chamber and the volume of the suck-back chamber are changed equally but increased and decreased inversely. Therefore, for example, the diaphragm valve stops discharge of the liquid while performing suck-back of the liquid by an adequate amount from a nozzle tip connected to the outlet passage.

In the diaphragm valve of the invention, furthermore, the first and second diaphragms are placed in the valve chamber and the suck-back chamber respectively so that each diaphragm is curved outwardly. It is therefore possible to prevent crushing of a film portion of each diaphragm by the pressure of the liquid allowed to flow in the passage in the valve body. As a result, the durability of the second diaphragm can be increased. The diaphragm valve does not need frequent replacement of the diaphragm as compared with the conventional diaphragm valve.

The diaphragm valve of the present invention is structured such that the circumferential edge portions of the first and second diaphragms are tightly retained by the retaining members for assembling those diaphragms in the valve body in which the passages are formed. Consequently, the assembling can be facilitated, a manufacturing cost can be reduced, and replacement of components can easily be made.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
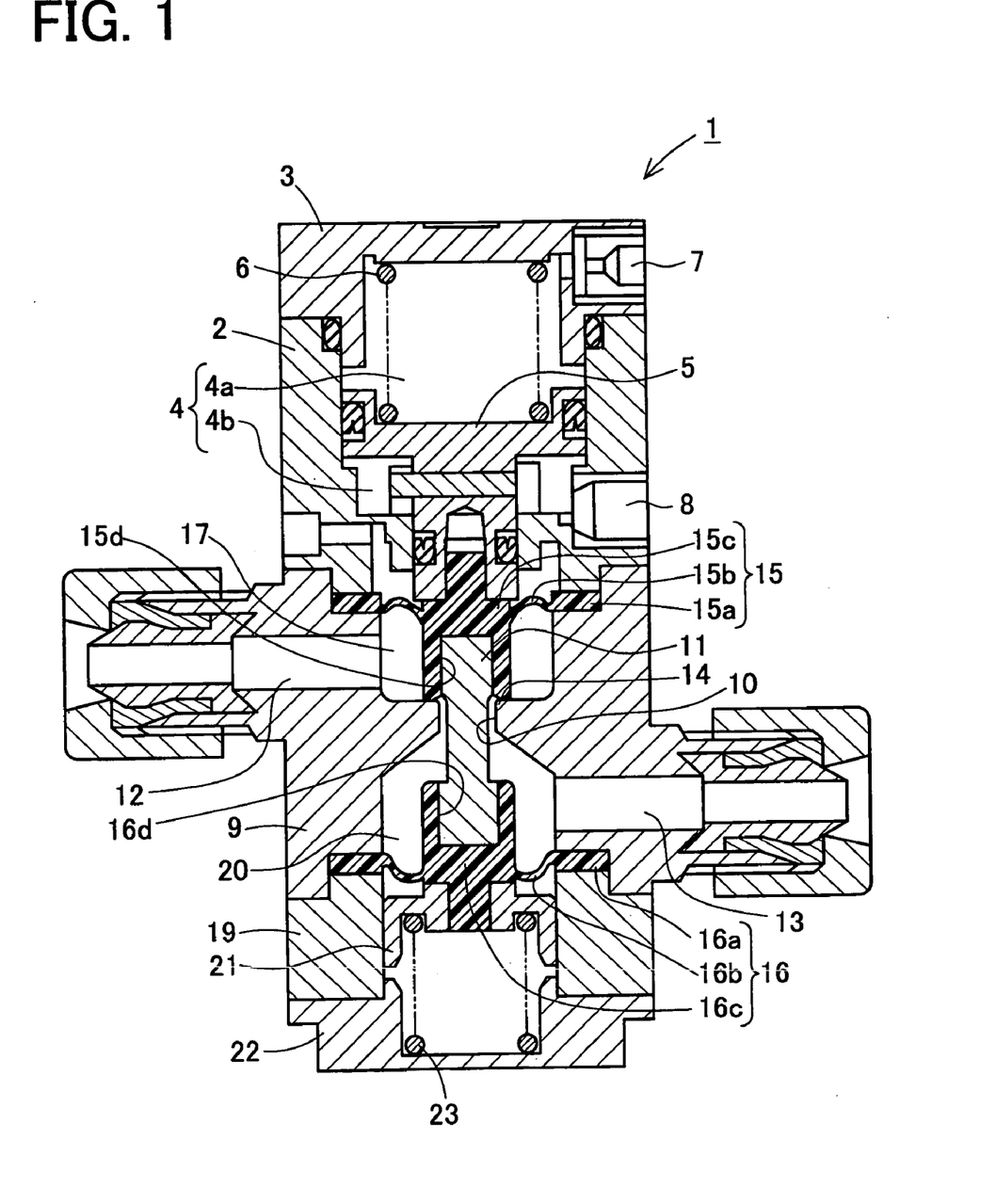
FIG. 1 is a sectional view of a diaphragm valve in a closed state in an embodiment.
Figure 2:
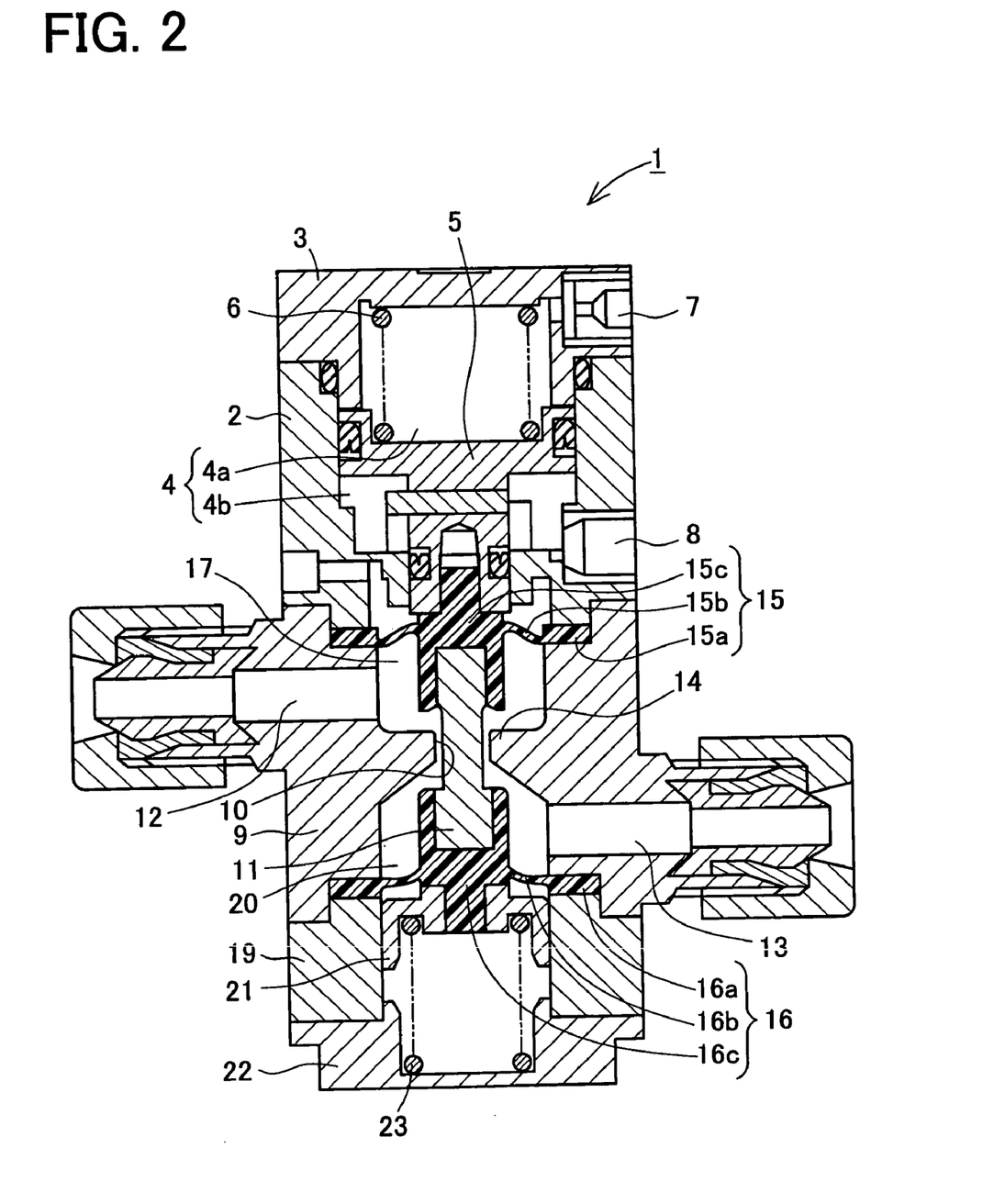
FIG. 2 is a sectional view of the diaphragm valve in an open state.

A detailed description of a preferred embodiment of a diaphragm valve embodying the present invention will now be given referring to the accompanying drawings. FIG. 1 is a sectional view of a diaphragm valve 1 in a closed state in the present embodiment. FIG. 2 is a sectional view of the diaphragm valve 1 in an open state. This diaphragm valve 1 is incorporated in for example a semiconductor manufacturing device and used as a chemical solution control valve which controls discharge of a chemical solution to be applied to semiconductor wafers.

The diaphragm valve 1 includes a piston cylinder assembly serving as an actuator for operating opening and closing of the valve by air pressure. In particular, the diaphragm valve 1 has a suck-back function to prevent a liquid from dripping out of a nozzle tip when the valve 1 is closed to stop discharge of the chemical solution.

The diaphragm valve 1 in the present embodiment is mainly constructed of a valve part in which a liquid such as the chemical solution is allowed to flow and an operating part (i.e., the actuator) for controlling the opening and closing of the valve 1. The operating part includes a cylinder 2 attached with a cover 3, forming therein a piston chamber 4. A piston 5 is slidably placed in the piston chamber 4 which is thereby partitioned into an upper piston chamber 4a and a lower piston chamber 4b. The piston 5 is normally urged downward by a spring 6 positioned in the upper piston chamber 4a.

The upper piston chamber 4a is in communication with an intake and exhaust port 7 formed in the cover 3. The lower piston chamber 4b is, on the other hand, in communication with an operating air port 8 formed in the cylinder 2 and connected to an air pump not shown. With this configuration, when compressed air is supplied from the air pump to the lower piston chamber 4b through the operating air port 8, the pressure of the air is exerted upwardly on the piston 5 against the spring force of the spring 6. The lower piston chamber 4b corresponds to a pressurizing chamber of the invention.

The valve part includes a valve body 9 which is formed with a through hole 10 coaxially with the piston 5. A connecting rod 11 is placed passing through the through hole 10. A valve chamber 17 which opens in the upper surface of the valve body 9 is provided above the through hole 10. This valve chamber 17 has a side opening in communication with an inlet passage 12. Under the through hole 10, a suck-back chamber 20 which opens in the lower surface of the valve body 9 is provided and has a side opening in communication with an outlet passage 13 extending in an opposite direction to the inlet passage 12. The inlet passage 12 is connected in fluid communication with a tank (not shown) storing a chemical solution and the outlet passage 13 is connected in fluid communication with a nozzle (not shown) through which the chemical solution is discharged to be applied to semiconductor wafers.

A valve seat 14 is formed in the valve body 9 at a portion surrounding an opening of the through hole 10 opening into the valve chamber 17. The connecting rod 11 passing through the through hole 10 is fixed, at its upper end, with a valve-integrated diaphragm (hereinafter, simply referred to as a first diaphragm) 15 which is brought into or out of contact with the valve seat 14 and, at its lower end, with a diaphragm for suck-back (hereinafter, simply referred to as a second diaphragm) 16. The first and second diaphragms 15 and 16 are identical in shape and size and both made of polytetrafluoroethylene (PTFE). Those diaphragms 15 and 16 are fixedly connected to the connecting rod 11 in inverse orientations; in other words, the diaphragms 15 and 16 are placed to have an outwardly curved portion with respect to the valve chamber 17 and the suck-back chamber 20 respectively.

The first diaphragm 15 is constructed of a circumferential edge portion 15a, a film portion 15b, and a valve element 15c. The circumferential edge portion 15a is thicker than the film portion 15b and is tightly held or retained between the valve body 9 and the cylinder 2 serving as a retaining member. The valve element 15c is a central portion which is brought into and out of contact with the valve seat 14 and includes a protruding portion (formed downwardly in FIG. 1) inside the valve chamber 17. This protruding portion is formed with a recess 15d having an opening toward the lower surface in which the connecting rod 11 is engaged. Therefore, the under surface of the valve element 15c surrounding the rod 11 will be brought into contact with the valve seat 14. The valve element 15c is further includes another protruding portion (formed upwardly in FIG. 1) outside the valve chamber 17. This protruding portion is screwed in a hole formed in the lower end of the piston 5 in the operating part. The film portion 15b is an upwardly curved portion of a thickness as thin as, e.g., 1 mm or less for flexibility. The first diaphragm 15 constructed as above, with the circumferential edge portion 15a being held between the valve body 9 and the cylinder 2, serves as a partition wall forming a part (a top wall) of the valve chamber 17 to sealingly close an open upper end of the valve body 9.

The second diaphragm 16 is constructed of an circumferential edge portion 16a, a film portion 16b, and a connecting portion 16c. The circumferential edge portion 16a is thicker than the film portion 16b and is tightly held or retained between the valve body 9 and a retaining member 19. The connecting portion 16c is a central portion connected to the connecting rod 11 and includes a protruding portion (formed upwardly in FIG. 1) inside the suck-back chamber 20. This protruding portion is formed with a recess 16d having an opening toward the upper surface in which the connecting rod 11 is engaged. The connecting portion 16c further includes another protruding portion (formed downwardly in FIG. 1) outside the suck-back chamber 20. This protruding portion is engaged in a center hole of a slidable spring holder 21. The retaining member 19 is of a cylindrical shape in which the spring holder 21 is slidably placed. The film portion 16b is a downwardly curved portion of a thickness as thin as, e.g., 1 mm or less for flexibility. The second diaphragm 16 constructed as above, with the circumferential edge portion 16a being held between the valve body 9 and the retaining member 19, serves as a partition wall forming a part (a bottom wall) of the suck-back chamber 20 to sealingly close an open lower end of the valve body 9.

The first diaphragm 15 is constructed such that the valve element 15c is normally urged in a valve-closing direction by the urging force of the spring 6 via the piston 5. On the other hand, the retaining member 19 fixedly mounted to the valve body 9 is attached with a spring holding cover 22 which covers an open lower end of the retaining member 19. An urging spring 23 is mounted between the spring holding cover 22 and the spring holder 21 slidable in the retaining member 19. The second diaphragm 16 is normally urged upward by the spring 23. Accordingly, even though the first and second diaphragms 15 and 16 are simply fit on the connecting rod 11, these diaphragms 15 and 16 can be moved tightly together by the forces of the springs 6 and 23 without accidentally becoming detached from the rod 11. The urging force of the spring 23 is much stronger than the fluid pressure acting on the second diaphragm 16 when the diaphragm valve 1 is opened (see FIG. 2), although the urging force of the spring 23 is lower than the urging force of the spring 6. Thus, the spring 23 will not interfere with the valve closing action of the spring 6. The diaphragm valve 1 constructed as above is a normal closed type valve in which the first diaphragm 15 is normally urged into contact with the valve seat 14.

Next, an explanation is made on operations of the diaphragm valve 1 in the present invention when it is used as a chemical solution control valve for controlling discharge of a chemical solution to semiconductor wafers.

When the compressed air is supplied into the lower piston chamber 4b through the operating air port 8, the piston 5 is moved up against the urging force of the spring 6. The valve element 15c of the first diaphragm 15 is brought out of contact with the valve seat 14, while the film portion 15b is deformed from a state shown in FIG. 1 to another state shown in FIG. 2. Simultaneously, the connecting portion 16c of the second diaphragm 16 connected to the first diaphragm 15 by means of the connecting rod 11 is moved up by the upward urging force of the spring 23 in association with the upward motion of the valve element 15c, while the film portion 16b is deformed from a state shown in FIG. 1 to another state shown in FIG. 2

In the diaphragm valve 1 in an opened state shown in FIG. 2, the inlet passage 12 and the outlet passage 13 are in fluid communication with each other through the valve chamber 17, the through hole 10, and the suck-back chamber 20. The chemical solution fed into the diaphragm valve 1 from the unillustrated tank is discharged to the semiconductor wafers through the nozzle connected to the outlet passage 13.

After a predetermined amount of the chemical solution is discharged, or applied, to the semiconductor wafers, the compressed air is released from the lower piston chamber 4b through the operating air port 8. The piston 5 is accordingly pushed down by the urging force of the spring 6, with accompanying deformation of the film portion 15b from the state shown in FIG. 2 to the state shown in FIG. 1. The valve element 15c of the first diaphragm 15 is brought into contact with the valve seat 14. Since the second diaphragm 16 is coupled to the first diaphragm 15 through the connecting rod 11, the connecting portion 16c is synchronously pushed down with accompanying deformation of the film portion 16b from the state shown in FIG. 2 to the state shown in FIG. 1. At this time, because the urging force of the spring 6 is stronger than that of the force 23, the valve element 15c of the first diaphragm 15 is urged into close contact with the valve seat 14 by the urging force of the spring 6. The diaphragm valve 1 is thus closed, in which the passage between the inlet passage 12 and the outlet passage 13 is shut off, terminating the application of the chemical solution from the nozzle to the semiconductor wafers.

Figure 3:
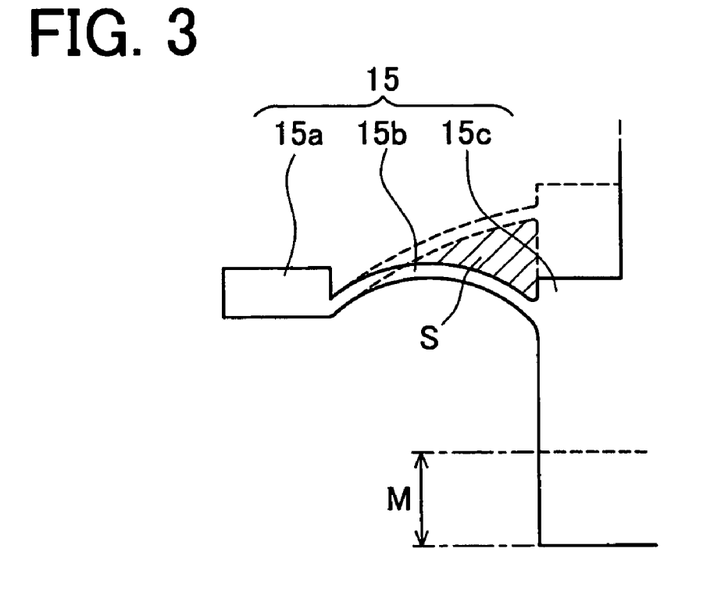
FIG. 3 is an explanatory view showing motions of a film portion of the first diaphragm in a position illustrated by solid lines in the valve closed state and in another position illustrated by dotted lines in the valve opened state.
Figure 4:
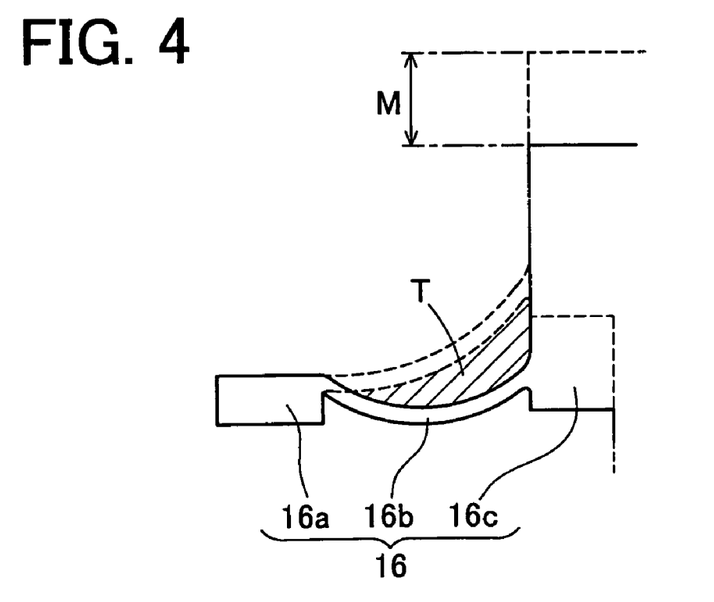
FIG. 4 is an explanatory view showing motions of a film portion of the second diaphragm in a position illustrated by solid lines during suck-back and in another position illustrated by dotted lines during non-suck-back.

Next, an explanation is made on the relationship between the first and second diaphragms 15 and 16 in relation to respective motions in association with the opening and closing of the diaphragm valve 1. FIG. 3 is an explanatory view showing motions of the film portion 15b of the first diaphragm 15, particularly showing the film portion 15b in a position in the valve closed state, illustrated by solid lines, and in another position (a deformed state) in the valve opened state, illustrated by dotted lines. FIG. 4 is an explanatory view of motions of the film portion 16b of the second diaphragm 16, particularly showing the film portion 16b in a position during suck-back, illustrated by solid lines, and in another position during non-suck-back, illustrated by dotted lines.

The diaphragm valve 1 is supplied with the compressed air through the operating air port 8 and thus starts an opening operation. The valve element 15c of the first diaphragm 15 is moved up by a predetermined amount (distance) M to the position as shown by the dotted lines in FIG. 3. The second diaphragm 16 being coupled to the first diaphragm 15 through the connecting rod 11 is moved up by a predetermined amount (distance) M to the position as shown by the dotted line in FIG. 4, with accompanying deformation of the film portion 16b, in synchronization with the motion of the first diaphragm 15.

At this time, the first diaphragm 15, or the valve element 15c, is moved up by the predetermined amount M as shown in FIG. 3, deforming the film portion 15b, so that the volume of the valve chamber 17 partitioned by the first diaphragm 15 is increased by an amount having a sectional area S indicated by oblique lines in FIG. 3. On the other hand, the second diaphragm 16, or the connecting portion 16c, is moved up by the predetermined amount M as shown in FIG. 4, deforming the film portion 16b. Therefore, the volume of the suck-back chamber 20 partitioned by the second diaphragm 16 is reduced by an amount having a sectional area T indicated by oblique lines in FIG. 4.

The first and second diaphragms 15 and 16 are identical in shape and size and their moving amounts (distances) M, that is, deformation amounts of the film portions 15b and 16b, are equal. Therefore the increased volume (with the sectional area S) of the valve chamber 17 is equal to the reduced amount (with the sectional area T) of the suck-back chamber 20. Consequently, the total volume of the valve chamber 17 and the suck-back chamber 20 remains unchanged at the time when the valve 1 is opened.

When the compressed air is released from the diaphragm valve 1 through the operating air port 8, the valve 1 is closed as mentioned above. At this time, the first diaphragm 15 is operated such that the valve element 15c is moved down by the predetermined amount M, deforming the film portion 15b, to the position as shown by the solid lines in FIG. 3. The second diaphragm 16 being coupled to the first diaphragm 15 through the connecting rod 11 is also moved down by the predetermined amount M to the position as shown by the solid lines in FIG. 4, deforming the film portion 16b, in synchronization with the motion of the first diaphragm 15.

At this time, the first diaphragm 15, or the valve element 15c, is moved down by the predetermined amount M as shown in FIG. 3, deforming the film portion 15b. Accordingly, the volume of the valve chamber 17 partitioned by the first diaphragm 15 is reduced by an amount having the sectional area S. On the other hand, the second diaphragm 16, or the connecting portion 16c, is pushed down by the predetermined amount M as shown in FIG. 4, deforming the film portion 16b. Thus, the volume of the suck-back chamber 20 partitioned by the second diaphragm 16 is increased by an amount having the sectional area T. As in the valve opening time, the total volume of the valve chamber 17 the suck-back chamber 20 remains unchanged at the time when the valve 1 is closed.

In general diaphragm valves, during opening and closing, only a suck-back chamber is likely to come under the influence of volume changes in association with motions of a valve-integrated diaphragm. Specifically, inappropriate draw-back of a liquid into the suck-back chamber is caused when the diaphragm is brought out of contact with the valve seat and inappropriate push-out of a liquid from the suck-back chamber is caused when the diaphragm is brought into contact with the valve seat.

In the diaphragm valve 1 in the present embodiment, on the other hand, the first and second diaphragms 15 and 16 are integrally coupled by means of the connecting rod 11 for allowing their synchronous motions and they are identical in shape and size. Accordingly, the volumes of the valve chamber 17 and the suck-back chamber 20 are equally changed, but inversely changed (that is, one increased and the other decreased) in association with the opening/closing of the diaphragm valve 1. Thus, the volume change of the such-back chamber 20 caused by the motion of the diaphragm 15 is absorbed (counterbalanced) by the motion of the second diaphragm 16. At the valve closing time, the valve 1 can stop discharge of the liquid while performing the suck-back function of an adequate amount of the liquid from the nozzle tip.

As described above, the diaphragm 1 in the present embodiment is constructed such that the first and second diaphragms 15 and 16 are placed in inverse orientations so that the film portions 15b and 16b are outwardly curved with respect to the valve chamber 17 and the suck-back chamber 20 respectively. This makes it possible to prevent the extremely thin film portions 15b and 16b made of for example PTFE from being crushed by the fluid pressure (0.1 to 0.2 MPa in the present embodiment) of the chemical solution flowing through the valve body 9. Therefore, the diaphragm valve 1 can increase durability of the second diaphragm 16 and avoid frequent replacement of the diaphragm as compared with the conventional diaphragm valve 100.

Furthermore, the diaphragm valve 1 in the present embodiment is constructed such that the cylinder 2 and the retaining member 19 and others are assembled to the valve body 9 which is a single block internally formed with a passage and, at their assembling, the first and second diaphragms 15 and 16 are simply partially held between the corresponding components. Since the assembling of the diaphragm 1 is easy as above, the manufacturing cost thereof can be reduced and the replacement of components can be facilitated.

The present invention may be embodied in other specific forms without departing from the spirit or essential characteristics thereof.

Although the first and second diaphragms 15 and 16 used in the above embodiment are identical in shape, the second diaphragm (i.e., the suck-back diaphragm) may have for example a film portion having a surface area about twice as large as a surface area of the film portion of the first diaphragm (i.e., the valve-integrated diaphragm). This structure will be effective for control of for example a liquid with high viscosity.

In the present embodiment, the piston cylinder assembly is used as the actuator for controlling the opening/closing of the valve. Instead of the piston cylinder, for example an electrically driven cylinder or a solenoid may be used.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A diaphragm valve comprising:
   an actuator; and
   a valve part including:
   an inlet passage;
   an outlet passage which is brought into communication with the inlet passage when the diaphragm valve is opened;
   a valve chamber provided with a valve seat and placed between the inlet passage and the outlet passage;
   a suck-back chamber placed between the inlet passage and the outlet passage and in vertically aligned relation with the valve chamber;
   a through hole through which the valve chamber and the suck-back chamber are brought into communication with each other when the diaphragm valve is opened;
   a first diaphragm which integrally includes a valve element and forms a part of the valve chamber, the first diaphragm being deformable so that the valve element is brought into and out of contact with the valve seat by operation of the actuator;
   a second diaphragm which forms a part of the suck-back chamber, the second diaphragm being substantially identical in shape to the first diaphragm; and
   a connecting rod which movably placed through the through hole and connects the first and second diaphragms so that the first and second diaphragms are synchronously deformed by operation of the actuator, thereby changing volumes of the valve chamber and the suck-back chamber in reverse to each other;
   wherein the diaphragm valve further includes a valve body,
   the actuator is a piston cylinder assembly including a cylinder integrally provided with the valve body and a piston slidably placed in the cylinder, and
   the valve element includes an outwardly protruding portion outside the valve chamber, the protruding portion being connected to the piston; and
   wherein the diaphragm valve further includes a spring in the cylinder, the spring urging the piston toward the first diaphragm, and the cylinder is formed with a pressurizing chamber in which air pressure is applied to the piston from the first diaphragm side to move the piston upward.

2. The diaphragm valve according to claim 1, wherein the second diaphragm includes a circumferential edge portion which is tightly retained to be positioned in the valve part, a centrally formed connecting portion which is connected to the connecting rod, and a film portion integrally formed between the circumferential edge portion and the connecting portion; and wherein the diaphragm valve further includes:
- a slidable spring holding member which is slidably mounted outside the suck-back chamber and is connected to the connecting portion of the second diaphragm; and
- an urging spring which urges the second diaphragm upward through the slidable spring holding member.

3. A diaphragm valve comprising:
an actuator; and
a valve body formed with:
an inlet passage;
an outlet passage which is brought into communication with the inlet passage when the diaphragm valve is opened;
a valve chamber which has an open upper end and is provided with a valve seat, the valve chamber being placed between the inlet passage and the outlet passage;
a suck-back chamber which has an open lower end and is placed between the inlet passage and the outlet passage;
a through hole through which the valve chamber and the suck-back chamber are brought into communication with each other when the diaphragm valve is opened, a surrounding portion of the through hole forming the valve seat;
a first diaphragm which integrally includes a valve element and a circumferential edge portion and is placed to close the open end of the valve chamber, the first diaphragm being deformable so that the valve element is brought into and out of contact with the valve seat;
a second diaphragm which is provided with a circumferential edge portion and is placed to close the open end of the suck-back chamber;
a first retaining member which retains the circumferential edge portion of the first diaphragm against the valve body to fix the first diaphragm in place;
a second retaining member which retains the circumferential edge portion of the second diaphragm against the valve body to fix the second diaphragm in place; and
a connecting rod which is placed through the through hole and connects the first and second diaphragms so that the first and second diaphragms are synchronously deformed by operation of the actuator, thereby changing volumes of the valve chamber and the suck-back chamber in reverse to each other;
wherein the actuator is a piston cylinder assembly including a cylinder integrally provided with the valve body and a piston slidably placed in the cylinder, and
the valve element includes an outwardly protruding portion outside the valve chamber, the protruding portion being connected to the piston; and
wherein the diaphragm valve further includes a spring in the cylinder, the spring urging the piston toward the first diaphragm, and the cylinder is formed with a pressurizing chamber in which air pressure is applied to the piston form the first diaphragm side to move the piton upward.

4. The diaphragm valve according to claim 3,
wherein the second diaphragm further includes a centrally formed connecting portion which is connected to the connecting rod and a film portion integrally formed between the circumferential edge portion and the connecting portion; and wherein the second retaining member is of a cylindrical shape having an open end, in which a slidable spring holding member is slidably mounted, and
the diaphragm valve further includes a spring holding cover which covers the open end of the second retaining member and an urging spring mounted between the spring holding cover and the spring holding member.

5. A diaphragm valve comprising:
an actuator; and
a valve part including:
an inlet passage;
an outlet passage which is brought into communication with the inlet passage when the diaphragm valve is opened;
a valve chamber provided with a valve seat and placed between the inlet passage and the outlet passage;
a suck-back chamber placed between the inlet passage and the outlet passage and in vertically aligned relation with the valve chamber;
a through hole through which the valve chamber and the suck-back chamber are brought into communication with each other when the diaphragm valve is opened;
a first diaphragm which integrally includes a valve element and forms a part of the valve chamber, the first diaphragm being deformable so that the valve element is brought into and out of contact with the valve seat by operation of the actuator;
a second diaphragm which forms a part of the suck-back chamber, the second diaphragm being substantially identical in shape to the first diaphragm; and
a connecting rod which movably placed through the through hole and connects the first and second diaphragms so that the first and second diaphragms are synchronously deformed by operation of the actuator, thereby changing volumes of the valve chamber and the suck-back chamber in reverse to each other; and
wherein the first and second diaphragms are placed in inverse orientations.

6. The diaphragm valve according to claim 5, wherein the first and second diaphragms are mounted to have an outward curve in a direction away from the valve chamber and the suck-back chamber, respectively.

7. A diaphragm valve comprising:
an actuator; and
a valve body formed with:
an inlet passage;
an outlet passage which is brought into communication with the inlet passage when the diaphragm valve is opened;
a valve chamber which has an open upper end and is provided with a valve seat, the valve chamber being placed between the inlet passage and the outlet passage;
a suck-back chamber which has an open lower end and is placed between the inlet passage and the outlet passage;
a through hole through which the valve chamber and the suck-back chamber are brought into communication with each other when the diaphragm valve is opened, a surrounding portion of the through hole forming the valve seat;
a first diaphragm which integrally includes a valve element and a circumferential edge portion and is placed to close the open end of the valve chamber, the first diaphragm being deformable so that the valve element is brought into and out of contact with the valve seat;
a second diaphragm which is provided with a circumferential edge portion and is placed to close the open end of the suck-back chamber;

a first retaining member which retains the circumferential edge portion of the first diaphragm against the valve body to fix the first diaphragm in place;

a second retaining member which retains the circumferential edge portion of the second diaphragm against the valve body to fix the second diaphragm in place; and a connecting rod which is placed through the through hole and connects the first and second diaphragms so that the first and second diaphragms are synchronously deformed by operation of the actuator, thereby changing volumes of the valve chamber and the suck-back chamber in reverse to each other; and wherein the first and second diaphragms are placed in inverse orientations.

* * * * *